|  |  |
|---|---|
| United States Patent [19] | [11] 3,993,634 |
| Burgaud | [45] Nov. 23, 1976 |

[54] PHOTODEGRADABLE VINYL CHLORIDE POLYMER CONTAINING A FERROCENE AND AN α-PHENYL INDOLE

[75] Inventor: Philippe Burgaud, Brussels, Belgium

[73] Assignee: Solvay & Cie., Brussels, Belgium

[22] Filed: Feb. 28, 1975

[21] Appl. No.: 554,166

[30] Foreign Application Priority Data
Apr. 19, 1974 Luxembourg............................ 69892

[52] U.S. Cl.............................. 526/4; 260/45.8 N;
260/DIG. 43; 526/6; 526/344; 526/914
[51] Int. Cl.² .................... C08F 114/06; C08J 3/20
[58] Field of Search................ 260/DIG. 43, 45.8 N,
260/92.8 R, 92.8 A

[56] References Cited
UNITED STATES PATENTS
3,888,818   6/1975   Deblandre et al. ............. 260/45.8 N FOREIGN PATENTS OR APPLICATIONS
2,244,800   3/1973   Germany ..................... 260/DIG. 43
2,325,390   5/1973   Germany
1,095,568   12/1967  United Kingdom
1,300,605   12/1972  United Kingdom Primary Examiner—Eugene C. Rzucidlo
Attorney, Agent, or Firm—Spencer & Kaye

[57] ABSTRACT

Photodegradable compositions based on vinyl chloride polymers containing a ferrocene and an α-phenylindole as sensitizers to accelerate natural photodegradation and their use in the production of hollow bodies. Said compositions undergo photodegradation appreciably more quickly than known compositions based on vinyl chloride polymers containing solely a ferrocene.

10 Claims, No Drawings

PHOTODEGRADABLE VINYL CHLORIDE POLYMER CONTAINING A FERROCENE AND AN α-PHENYL INDOLE

The present invention relates to photodegradable compositions based on vinyl chloride polymers.

Plastics materials and particularly vinyl chloride polymers have acquired a major share in the packaging materials market. A high proportion of this packaging material is scattered about the countryside as litter which undergoes natural photodegradation by an extremely slow process.

The possibility of accelerating the removal of litter based on vinyl chloride polymers could contribute towards alleviating this problem.

It has therefore already been suggested to incorporate various sensitisers in vinyl chloride polymers to accelerate natural photodegradation.

German Application No. 2 325 390 of May 18th, 1973 to Imperial Chemical Industries describes compositions based on vinyl chloride polymers that are to be used in the production of self-destroying packaging materials that contain ferrocene or a substituted ferrocene derivative as degradation activator. The proposed ferrocene derivatives comprise ferrocene substituted with an alkyl, cycloalkyl, ester or ketone group. The rate of degradation of packaging materials produced from these compositions is still insufficiently high however.

There has now been discovered, in accordance with the present invention, compositions based on vinyl chloride polymers containing a ferrocene which possess increased aptitude for photodegradation and make it possible to produce packaging materials that will undergo photodegradation appreciably more quickly.

The present invention relates to photodegradable compositions based on vinyl chloride polymers containing a ferrocene which are characterised in that they contain an α-phenyl indole.

The use of these compositions in the production of hollow bodies constitutes a further aspect of the present invention.

α-phenyl indoles are known to be heat stabilisers for vinyl chloride polymers. A surprising aspect of the present invention is therefore the fact that the addition of these compounds to photodegradable compositions based on vinyl chloride polymers containing a ferrocene results in increased aptitude for photodegradation.

It should be noted here that the activation of degradation in no way impairs the heat stability of the final compositions.

All α-phenyl indoles, whether substituted or unsubstituted, are suitable for use in the production of compositions according to the present invention. The preferred α-phenyl indoles however correspond to the following general formula:

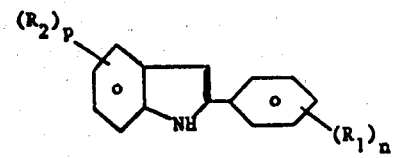

in which:

$R_1$ and $R_2$ are radicals that may be the same or different and are selected from alkyl radicals which are such that the total number of carbon atoms they contain is between 4 and 20

$n$ is an integer which is such that $0 \leq n \leq 5$ $p$ is an integer which is such that $0 \leq p \leq 4$ The compounds preferentially used as activators of the photodegradation of compositions based on vinyl chloride polymers containing a ferrocene contain an α-phenyl indole corresponding to the above general formula in which $p = 0$ and $n = 1$. Cyclohexyl and dodecyl α-phenyl indoles are particularly preferred.

The α-phenyl indoles used in the present invention can be produced in known manner in accordance with the following reaction system where $R_1$, $R_2$, $n$ and $p$ correspond to the above definitions.

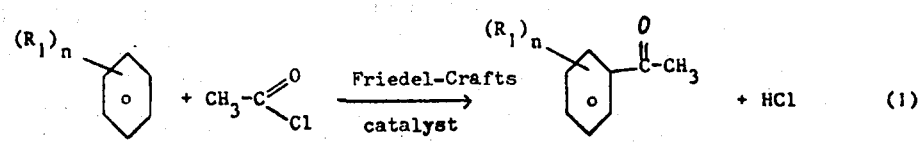

(1)

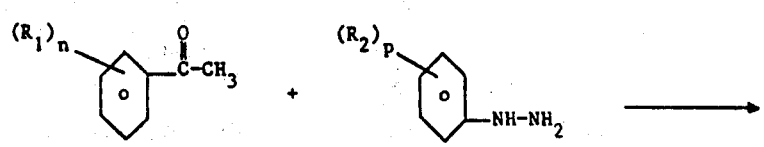

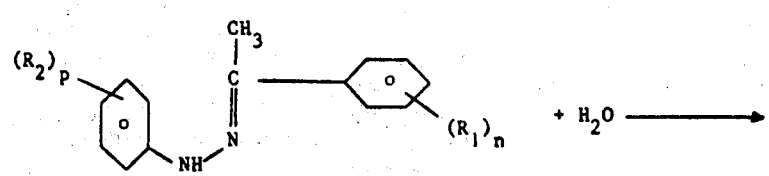

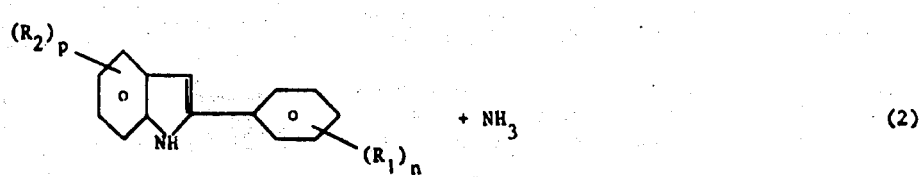

(2)

The preparation of the preferred α-phenyl indoles is described in greater detail in French Pat. Application No. 72 32076 of Sept. 8th, 1972, corresponding to U.S. Pat. No. 3,888,818.

The amount of α-phenyl indole present in the compositions according to the invention is not critical. The presence of amounts as little as 0.05% by weight calculated on the vinyl chloride polymer is sufficient for appreciably accelerating the rate of photodegradation of the compositions. The addition of larger amounts of degradation activators in accordance with the invention accelerates the rate still further. However, it is advisable not to exceed an α-phenyl indole content of 1% by weight calculated on the vinyl chloride polymer to avoid unnecessarily increasing the cost price of the compositions.

The photodegradable compositions of the present invention therefore generally contain as degradation activator from 0.05 to 1% by weight, calculated on the vinyl chloride polymer, of an α-phenyl indole.

The preferred α-phenyl indole contents are between 0.1 and 0.6% by weight.

Furthermore all ferrocenes are suitable for use in the preparation of compositions according to the invention, namely unsubstituted ferrocene and its substituted derivatives as for example alkyl and cycloalkyl ferrocenes and ferrocenes substituted with a ketone or ester radical. A non-restrictive list of substituted ferrocene derivatives that could be used in the compositions according to the invention includes the following: 1,1'-diacetyl ferrocene, 1,1'-di(4-methoxycinnamoyl) ferrocene, 1,1'-di(4-chlorocinnamoyl)-ferrocene, 1,1'-dicinnamoyl ferrocene, 1,1'-di(4-nitrocinnamoyl) ferrocene, 1,1'-diphenyl ferrocene, ferrocene aldehydes, esters of ferrocene monocarboxylic acids etc.

From the point of view of ease of supply and cost price it is obviously preferable to use an unsubstituted ferrocene rather than substituted derivatives.

The ferrocene is generally used in amounts of 0.01 to 2% by weight calculated on the vinyl chloride polymer.

By vinyl chloride polymer we mean polymers and copolymers of vinyl chloride containing at least 80% by weight of monomer obtained by classic polymerisation processes (emulsion, suspension and bulk polymerisation). The vinyl chloride polymers obtained by the gas phase process described for example in the Applicants' French Patent Nos. 1 535 224 of 28.8.1967 are also suitable for preparing compositions according to the invention.

The incorporation of the photodegradation activators in the vinyl chloride polymer does not present any particular problems. They are blended with the polymer in known manner when the premix is prepared. It will of course be appreciated that the compositions according to the invention may also contain other ingredients such as processing auxiliaries, reinforcing agents, lubricants, pigments etc.

The photodegradable compositions according to the invention can be processed by all the conventional methods used for thermoplastic materials. They are particularly suitable for the production of hollow bodies — flasks, bottles and other containers — intended for packaging liquids and solid materials. They are more particularly suitable for the production of mineral water bottles by blow extrusion using high speed equipment.

The use of the compositions according to the invention for the extrusion blow moulding of hollow bodies for packaging mineral waters constitutes one of the preferred aspects of the present invention.

In the case of this application we particularly recommend using a substituted α-phenyl indole derivative.

Such derivatives are less soluble in water than α-phenyl indole and there is therefore less risk that they will migrate into the packaged products, thereby impairing their organoleptic properties.

The invention is illustrated but in no way restricted by the following EXamples. All the Examples use as vinyl polymer a polyvinyl chloride with a K value of 58 (in cyclohexanone at 25° C) obtained by polymerisation in aqueous suspension.

EXAMPLES $R_1$, $R_2$ and 3

The first set of Examples relates to films (0.4 mm thick) pressed from a crepe obtained by compounding a premix having the composition shown in the attached Table I. The films were exposed out of doors in Brussels during the Autumn of 1973. Their brittleness was measured by folding them through 180°. After 6 weeks' exposure the only film that ruptured purely on folding was the film of Example 3.

After 16 weeks' exposure the film of Reference Example 1 also ruptured following folding through 180° whereas the film of Reference Example 2 had not become brittle even after this length of time.

EXAMPLES $R_4$, $R_5$ and 6

This set of Examples relates to films (0.4 mm thick) pressed from a crepe obtained by compounding a premix having the composition shown in the attached Table II.

a. The films were subjected to radiation from a xenon lamp Type XE 1500 with a total light intensity of 200,000 lux and were placed 15 cm from the light source.

After 3 weeks' exposure the films of Reference Example 5 and Example 6 had become brittle.

b. The films were exposed out of doors in Brussels at the beginning of 1974. After 7 weeks' exposure the only film that had become brittle was the film of Example 6.

EXAMPLES $R_7$, $R_8$ and 9

This set of Examples relates to bottles produced by extrusion blow moulding premixes having the composition shown in the attached Table III.

The bottles were exposed out of doors in Brussels during the summer of 1973.

The brittleness of the bottles was measured by crushing them with a press under just sufficient pressure to flatten them. In this test samples that broke before complete crushing or flattening were regarded as brittle.

After 15 days' exposure only the bottle of Example 9 was found to be brittle.

It was necessary to expose the bottle of Reference Example 7 for one month before it became equally brittle.

Finally the bottle of Reference Example 8 had still not become brittle after 6 months' exposure.

Table I

| Compositions,pp | Examples $R_1$ | $R_2$ | 3 |
|---|---|---|---|
| Polyvinyl chloride | 100 | 100 | 100 |
| Polyethylene wax | 0,1 | 0,1 | 0,1 |
| Tin stabiliser | 1 | 1 | 1 |
| Ferrocene | 0,4 | — | 0,2 |
| α-phenyl indole | — | 0,4 | 0,2 |

Table II

| Compositions,pp | Examples | | |
|---|---|---|---|
| | R₄ | R₅ | 6 |
| Polyvinyl chloride | 100 | 100 | 100 |
| Polyethylene wax | 0,1 | 0,1 | 0,1 |
| Tin stabiliser | 1 | 1 | 1 |
| Ferrocene | — | 0,3 | 0,2 |
| α(o-cyclohexyl phenyl) indole | 0,1 | — | 0,1 |

Table III

| Compositions,pp | Examples | | |
|---|---|---|---|
| | R₇ | R₈ | 9 |
| Polyvinyl chloride | 100 | 100 | 100 |
| Polyethylene wax | 0,1 | 0,1 | 0,1 |
| Tin stabiliser | 1 | 1 | 1 |
| Ferrocene | 0,45 | 0,20 | 0,20 |
| α-phenyl indole | — | — | 0,25 |

I claim:

1. In a photodegradable composition based on a vinyl chloride polymer and containing an effective amount of a ferrocene as a photodegradable activator, the improvement wherein the composition contains an effective amount of an α-phenyl indole as a further photodegradation activator.

2. A photodegradable composition as in claim 1, wherein the α-phenyl indole corresponds to the general formula:

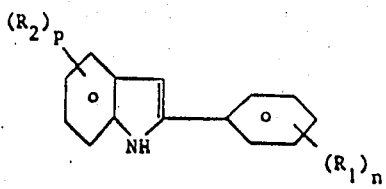

in which:

R₁ and R₂ are radicals that may be the same or different and are selected from the group consisting of alkyl radicals which are such that the total number of carbon atoms they contain is between 4 and 20

$n$ is an integer which is such that $0 \leq n \leq 5$ $p$ is an integer which is such that $0 \leq p \leq 4$.

3. The photodegradable composition as in claim 2, wherein $n = 1$ and $p = 0$.

4. The photodegradable composition as in claim 3, wherein the α-phenyl indole is selected from the group consisting of dodecyl-α-phenyl indole and cyclohexyl-α-phenyl indole.

5. The photodegradable composition as in claim 1 wherein it contains from 0.05 to 1% by weight of α-phenyl indole calculated on the vinyl chloride polymer.

6. The photodegradable composition as in claim 5, wherein it contains from 0.1 to 0.6% by weight of α-phenyl indole calculated on the vinyl chloride polymer.

7. The photodegradable composition as in claim 1 wherein it contains from 0.05 to 1% by weight of α-phenyl indole calculated on the vinyl chloride polymer and 0.01 to 2% by weight calculated on the vinyl chloride polymer.

8. A process for making a photodegradable packaging material by adding a photodegradation activator to a photodegradable vinyl chloride polymer containing a ferrocene comprising adding an effective amount of an α-phenyl indole to the vinyl chloride polymer as a photodegradation activator.

9. The process according to claim 8 wherein hollow bodies are produced from the packaging material.

10. The process according to claim 8 wherein hollow bodies intended to contain mineral waters are produced from the packaging material.

* * * * *